DANIEL B. McRAE
INVENTOR

Nov. 18, 1941.   D. B. McRAE   2,263,008
HOLDER FOR LENSES DURING SURFACE COATING
Filed Sept. 28, 1940   2 Sheets-Sheet 2

DANIEL B. McRAE
INVENTOR

BY
ATTORNEY

Patented Nov. 18, 1941

2,263,008

UNITED STATES PATENT OFFICE 2,263,008

HOLDER FOR LENSES DURING SURFACE COATING

Daniel Brent McRae, Rochester, N. Y., assignor to Eastman Kodak Company, Rochester, N. Y., a corporation of New Jersey Application September 28, 1940, Serial No. 358,846

9 Claims. (Cl. 91—12.2)

This invention relates to apparatus for holding lenses during the surface coating thereof with interference layers to prevent Fresnel reflections.

This subject is also discussed in copending applications 358,855, McLeod, 358,850, Vokes, 358,845, Lee, and 358,854, Sabine, filed concurrently herewith. The coating of lens surfaces with a metallic fluoride or combination of fluorides was proposed by Professor Strong in the Journal of the Optical Society of America, January 1936, vol. 26, page 73.

It is an object of the present invention to provide a holder for supporting lenses, specifically lenses in mounts during surface coating thereof.

It is an object of the invention to provide means for holding a plurality of lenses equidistant from the filament from which the material being coated is evaporated.

It is an object of the preferred embodiment of the invention to provide such a holder in which the distance of lenses to the filament can be maintained even when different filaments are used or when a filament sags by an unusual amount.

It is an object of a preferred feature of the invention to provide a holder adapted to accommodate interchangeable filaments.

It is a specific object of the invention to provide such a holder which will not interfere with or delay the evacuation of the container in which the coating process is to be carried out.

It is an object of one embodiment of the invention to provide a holder which can accommodate a very large number of lenses to be coated simultaneously.

According to the invention, a bell jar with a filament supported therein to carry and heat the fluorite or other material to be evaporated is provided with a spherical dish which is placed concentric with the filament and whose radius of curvature is large compared to the area of the lenses to be coated. The lenses are each mounted in their barrels and the barrels are placed adjacent to one another on the dish, i. e. resting on the surface under the force of gravity or in recesses or holes in the surface. To insure concentricity even when different size or shape filaments are used, the spacing between the dish and the filament is made adjustable, preferably by making the filament support adjustable. To permit easy replacement of the filament, which is usually in the form of a helical coil of wire, the ends of this wire are clamped by spring clips, i. e. a snap-on filament is used.

The lenses which are usually about midway in their barrels, form with their barrels, open end chambers one on each side of each lens. When the lenses are laid on a spherical dish the lower chamber is closed but not air tight. Even though it is not an air tight chamber, I have found that at very low pressures (vacuum) the air doesn't escape from this chamber very fast— possibly due to the molecular structure of the air. This slow transfer of air from this chamber to the rest of the container slows down the evacuating process very considerably. Thus, I have found that the evacuating can be speeded up by arranging that the two chambers bounding each lens have free communication with the atmosphere of the container—specifically with opposite sides of the dish. This is accomplished by a large number of small perforations in the dish at least one under each lens or by larger perforations into which the lens barrel can fit to be held by a collar on the barrel.

The simple arrangement with small holes has the advantage that the under surface is fully protected against any fluoride which may deposit due to the fact that not all of the fluoride travels in the straight lines from the filament.

The total number of lenses coated in one batch can be increased by having two spherical dishes one below the filament and one inverted above the filament. The upper one must have the larger type perforations so that the lenses will be in unobstructed view of the filament but the lower one may be of either type. Both dishes should be concentric with the filament and have substantially equal radii of curvature. If the lenses rest above the lower dish but at the same distance from the filament, as the upper ones, the lower dish should have to have a larger radius of curvature. When two dishes are used, it is obviously better to have the filament rather than the dishes adjustable in height.

Other objects and advantages of the invention and the invention itself will be fully understood from the following description when read in connection with the accompanying drawings in which.

Figure 1:
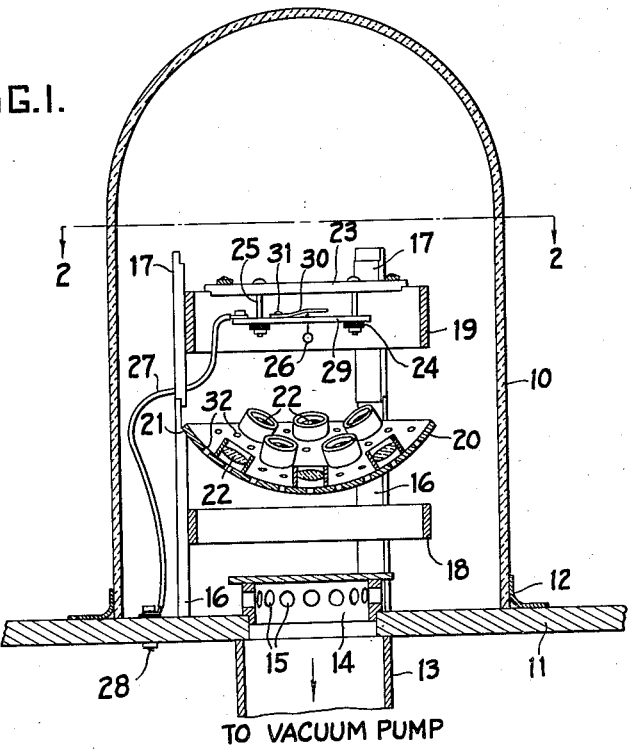
Fig. 1 is a cross section in elevation of a coating unit incorporating a preferred embodiment of the invention.
Figure 2:
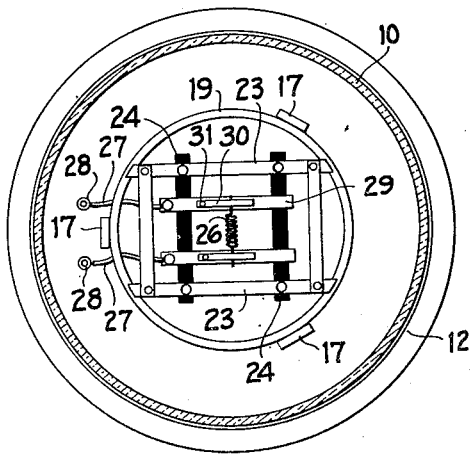
Fig. 2 is a plan view of the arrangement shown in Fig. 1.
Figure 3:
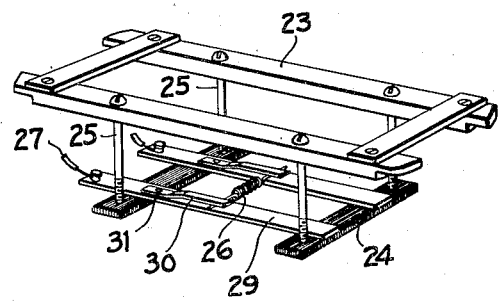
Fig. 3 is a perspective view, greatly enlarged, of the filament holder employed in Figs. 1 and 2.

Figs. 1, 2 and 3 will be described together. A bell jar 10 is supported on a metal table 11 and is provided with a rubber gasket 12 to insure an air tight joint. The container thus formed is adapted to be evacuated through a suitable tube 13. The top of this tube is capped with a cover 14 having holes 15 in the sides thereof. In this container there is provided a lens support consisting of three legs 16 equally spaced on a ring 18. A similar arrangement consisting of legs 17 and ring 19 is mounted on top of the lens support and is used for carrying the filament.

Figure 4:
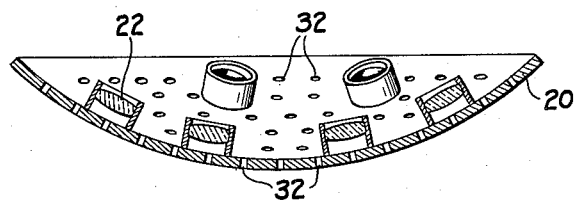
Fig. 4 is an enlarged view of the actual lens support shown in Fig. 1.

The actual lens support as illustrated in Fig. 4 consists of a spherical dish 20 carried by beveled off-sets 21 in the legs 16. The lenses 22 are each provided with cylindrical mounts and rest adjacent to one another in the spherical dish 20. The cylindrical mounts prevent any of the fluoride reaching the undersurface of the lens while the upper surface thereof is being coated.

By means of cross arms 23 which engage the ring 19 and supports 24 adjustably carried on bolts 25, a filament 26 is supported in the container concentric with the dish 20. This arrangement insures that the lenses will be all equidistant from the filament 26 when they are placed adjacent to one another on the dish 20. The filament 26 may have any of the forms described in Sabine's application mentioned above. To insure concentricity the heights of the dish 20 and the filament 26 are adjustable relative to one another by means of the bolts 25. I have found it preferable thus to adjust the filament rather than the dish.

Current to heat the filament 26 is provided through suitable leads 27 and insulated binding posts 28. The cross bars 24 are preferably of insulating material and support metal arms 29 to which the leads 27 are connected. In order to be easily interchangeable with other filaments, the filament 26 is held between the bars 29 and is clamped by spring member 30 rigidly attached at the points 31 to the bars 29.

Figure 5:
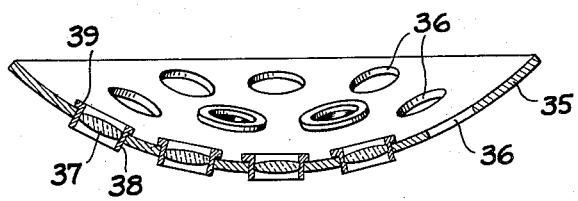
Fig. 5 is a modified form of the support shown in Fig. 4.

I have found that if a solid dish is used to support the lenses 22, the air enclosed in the chambers formed under each lens by the mount thereof is not released rapidly while the container is being evacuated. This delays the evacuation and increases the time of coating considerably. To overcome this, I provide perforations in the lens supporting dish at least one perforation for each lens, so that the chambers adjacent to the lower face of each lens have free communication with the lower side of the dish. These perforations may be small and numerous, as illustrated by the perforations 32 in Fig. 4, or may be large, as illustrated in Fig. 5. In the case of the small perforations 32, there should be a sufficient number of them so that no area of the dish equal to the area covered by the lens is without such a perforation.

In the arrangement shown in Fig. 5, the dish 35 is provided with large perforations 36 whose diameter is at least as large as the outside diameter of the lens mount 38 which carries the lens 37. The lenses 37 in their mounts 38 are dropped into the perforations 36 and are supported by a collar 39 on the upper end of each mount 38. In both the arrangement shown in Fig. 4 and that shown in Fig. 5, the air chambers on opposite sides of each lens have free communication with the opposite sides of the dishes (20 or 35).

Figure 6:
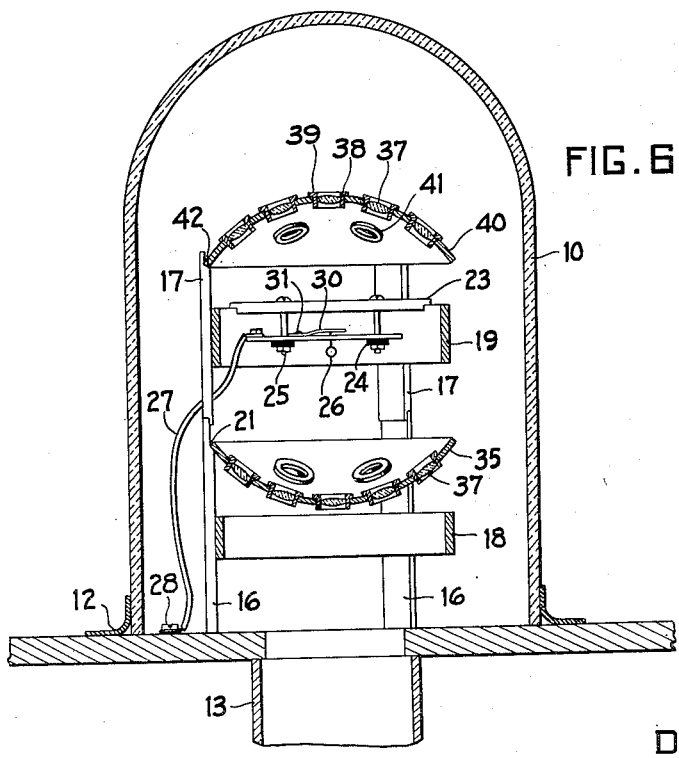
Fig. 6 is similar to Fig. 1 and illustrates a special embodiment of the invention.

In the arrangement shown in Fig. 6, the dish 35 with lenses 37, is mounted on the beveled off-sets 21 in the legs 16. Additional lenses in similar mounts are carried above the filament 26 in an inverted spherical dish 40 having apertures 41 similar in size and purpose to the apertures 36. The dish 40 is supported on ledges 42 in the legs 17. Obviously, it is not practical to use a dish of the type shown in Fig. 4 above the filament 26, and hence, a dish of the type shown in Fig. 5 is employed. In the arrangement shown the dishes 35 and 40 have the same radius of curvature. However, if the lenses rest on the lower dish as shown in Fig. 4, the lower dish should have a slightly greater radius of curvature so that the distances from the filament 26 to the lenses would be the same. If the coating tends to be slightly thicker on lenses below the filament than on those above, the radius of curvature of the two dishes may be selected to compensate for this difference.

When both dishes are used, it is obviously much easier to adjust the height of the filament to insure concentricity than to move the dishes relative to the base 11.

Having thus described the preferred embodiment of my invention in detail, I wish to point out that it is not limited to these specific structures but is of the scope of the appended claims.

What I claim and desire to secure by Letters Patent of the United States is:

1. Apparatus for holding lenses during surface coating thereof, comprising a container adapted to be evacuated, a filament for carrying and heating the material to be coated, means for supporting the filament in the container, a spherical dish whose radius of curvature is large compared to the diameter of the lenses to be coated, means for supporting the dish below and concentric with the filament and cylindrical mounts each marginally holding a lens and all adjacent to one another on the dish.

2. Apparatus according to claim 1 in which at least one of the supporting means includes means for slightly altering the separation of the dish and filament to adjust the concentricity.

3. Apparatus for holding a batch of lenses in an evacuated container to be coated by evaporation of a coating material from a filament in the container comprising a spherical dish whose radius of curvature is large compared to the diameter of the lenses to be coated and which is perforated at least once for each lens of the batch, means for supporting the dish concentric with the filament and a cylindrical mount marginally supporting each lens forming an open end chamber on each side of the lens, the mounts being supported by, and laterally spaced on, the dish and arranged with respect to the perforations so that the two chambers adjacent to each lens respectively have free communication with the atmosphere on opposite sides of the dish.

4. Apparatus for holding a batch of lenses in an evacuated container to be coated by evaporation of a coating material from a filament in the container comprising a spherical dish whose radius of curvature is large compared to the diameter of the lenses to be coated and which is perforated with a sufficient number of small perforations to include at least one in every circular area of the dish equal to the area of a lens, means for supporting the dish below and concentric with the filament, and a cylindrical mount marginally supporting each lens, said mount resting on the dish and overlying at least one perforation.

5. Apparatus for holding a batch of lenses in an evacuated container to be coated by evaporation of a coating material from a filament in the container comprising a spherical dish whose radius of curvature is large compared to the diameter of the lenses to be coated and which is perforated with large holes, means for supporting the dish concentric with the filament a cylindrical mount marginally supporting each lens, the holes in the dish having a diameter at least equal to the outside diameter of the cylindrical mount and a collar on the upper end of each mount, larger than the holes, each mount being supported in one of the holes by the collar.

6. Apparatus for holding a batch of lenses during surface coating thereof comprising a container adapted to be evacuated, a filament for carrying and heating the material to be coated, means for supporting the filament in the container, a spherical dish whose radius of curvature is large compared to the diameter of the lenses to be coated and which is perforated at least once for each lens of the batch, means for supporting the dish concentric with the filament and a cylindrical mount marginally supporting each lens forming an open end chamber on each side of the lens, the mounts being supported by, and laterally spaced on, the dish and arranged with respect to the perforations so that the two chambers adjacent to each lens respectively have free communication with the atmosphere on opposite sides of the dish.

7. Apparatus for holding a batch of lenses in an evacuated container to be coated by evaporation of a coating material from a filament in the container comprising two spherical dishes whose radii of curvature are substantially equal and are large compared to the diameter of the lenses to be coated and which are perforated with large holes, means for supporting the dishes, one above, one below and both concentric with, the filament, a cylindrical mount marginally supporting each lens, the holes in the dishes having diameters at least equal to the outside diameter of the cylindrical mounts and a collar on the upper end of each mount, larger than the holes, each mount being supported by its collar in one of the holes of the two dishes.

8. Apparatus for holding a batch of lenses during the surface coating thereof comprising a container adapted to be evacuated, a filament for carrying and heating the material to be coated, means for supporting the filament in the container, two spherical dishes whose radii of curvature are substantially equal and are large compared to the diameter of the lenses to be coated and which are perforated with large holes, means for supporting the dishes, one above, one below and both concentric with, the filament, a cylindrical mount marginally supporting each lens, the holes in the dishes having diameters at least equal to the outside diameter of the cylindrical mounts and a collar on the upper end of each mount, larger than the holes, each mount being supported by its collar in one of the holes of the two dishes and means on the filament supporting means for altering the height of the filament to adjust the concentricity with respect to the two dishes.

9. Apparatus according to claim 1 in which the filament is a helical coil of wire and the filament supporting means includes spring clamps for gripping the ends of the wire.

DANIEL BRENT McRAE.